United States Patent
Khillar et al.

(10) Patent No.: US 11,474,936 B2
(45) Date of Patent: Oct. 18, 2022

(54) AUTOMATING INTEGRATION TEST CASES BY RESOLVING TEST CASE DEPENDENCIES

(71) Applicant: Citrix Systems, Inc., Fort Lauderdale, FL (US)

(72) Inventors: Shiv Prasad Khillar, Bengaluru (IN); Saifulla Shaik, Bengaluru (IN); Nagendra Tank, Bengaluru (IN); Ahmed Fouzan, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 401 days.

(21) Appl. No.: 16/668,969

(22) Filed: Oct. 30, 2019

(65) Prior Publication Data

US 2021/0133089 A1 May 6, 2021

(51) Int. Cl.
*G06F 11/36* (2006.01)
*G06F 9/54* (2006.01)
*G06F 16/901* (2019.01)

(52) U.S. Cl.
CPC .......... *G06F 11/3692* (2013.01); *G06F 9/541* (2013.01); *G06F 11/3688* (2013.01); *G06F 16/9024* (2019.01)

(58) Field of Classification Search
CPC ....... G06F 9/541; G06F 11/3668–3692; G06F 16/9024
See application file for complete search history.

(56) References Cited

U.S. PATENT DOCUMENTS

| | | | | |
|---|---|---|---|---|
| 10,261,892 | B2* | 4/2019 | Patel | G06F 11/3692 |
| 10,417,058 | B1* | 9/2019 | Kesler | G06F 9/448 |
| 10,540,270 | B1* | 1/2020 | Surkatty | G06F 11/3688 |
| 10,922,213 | B2* | 2/2021 | Rodrigues Rosa Junior | G06F 11/3616 |
| 2005/0192979 | A1* | 9/2005 | Keller | H04L 41/082 |
| 2009/0222697 | A1* | 9/2009 | Thakkar | G06F 11/3676 714/38.1 |
| 2011/0066490 | A1* | 3/2011 | Bassin | G06F 11/3672 705/348 |

(Continued)

OTHER PUBLICATIONS

Biagiola et al., "E2E Web Test Dependency Detection Using NLP", published by Technical Report Series, 2019, FBK, Trento, Italy, pp. 1-11 (Year: 2019).*

*Primary Examiner* — S. Sough
*Assistant Examiner* — Zheng Wei
(74) *Attorney, Agent, or Firm* — Foley & Lardner LLP (57) ABSTRACT

Described embodiments provide systems and methods resolving test case dependencies to execute test suites. An agent may establish a connected graph representing a test suite having a test cases to test an application that provides APIs. The connected graph may have an ordered connection of nodes via paths corresponding to each test case. The agent may traverse the ordered connection of nodes in each path of the connected graph to identify test case dependencies and API assertion dependencies. The agent may resolve each test case dependency by executing the dependency. The agent may resolve each API assertion dependency by executing the dependency. The agent may concurrently execute, responsive to resolving each dependency, each test case. The agent may determine a result of an execution of a test case of the test suite. The result may indicate one of a success or failure in executing the test case.

20 Claims, 6 Drawing Sheets

(56) References Cited

U.S. PATENT DOCUMENTS

2013/0152047 A1\* 6/2013 Moorthi ............... G06F 11/368
　　　　　　　　　　　　　　　　　　　　　717/124
2013/0174178 A1\* 7/2013 Chakraborty ....... G06F 11/3672
　　　　　　　　　　　　　　　　　　　　　718/105

\* cited by examiner

AUTOMATING INTEGRATION TEST CASES BY RESOLVING TEST CASE DEPENDENCIES

FIELD OF THE DISCLOSURE

The present application generally relates to testing of applications. In particular, the present application relates to systems and methods for resolving test case dependencies to execute test suites.

BACKGROUND

Prior to roll out, individual modules of an application may be tested and examined to measure performance of each module and gauge the risk of failure from deploying the module. By examining individual modules, faults and other undesirable behavior may be discovered and alleviated, if not eliminated. Setting the perimeters of testing and the testing itself, however, may be performed done, thus significantly reducing the usefulness of such testing and examination and increasing time from development to rolling out of the application.

BRIEF SUMMARY

At least one aspect of this disclosure is directed to a method of resolving test case dependencies to execute test suites. An agent executing on a device having one or more processors may establish a connected graph representing a test suite having a plurality of test cases to test an application providing a plurality of application programming interfaces (APIs). The connected graph may have an ordered connection of nodes via a plurality of paths corresponding to each of the plurality of test cases. The ordered connection of nodes may represent one or more test case dependencies and one or more API assertion dependencies to be resolved. The agent may traverse the ordered connection of nodes in each path of the connected graph to identify the one or more test case dependencies and the one or more API assertion dependencies. The agent may resolve each of the one or more test case dependencies identified from traversing each path of the connected graph by executing each of the one or more test case dependencies. The agent may resolve each of the one or more API assertion dependencies identified from traversing each path of the connected graph by executing each of the one or more API assertion dependencies. The agent may concurrently execute, responsive to resolving each of the one or more test case dependencies and each of the one or more API assertion dependencies, each of the test cases of the plurality of test cases of the test suite. The agent may determine a result of an execution of a test case of the plurality of test cases of the test suite. The result may indicate one of a success or failure in executing the test case.

In some embodiments, the agent may establish the connected graph to have in at least one of the plurality of paths one or more user assertion dependencies to be resolved. Each of the one or more user assertion dependencies may include input data to be asserted responsive to a response from one or more API assertions. In some embodiments, the agent may resolve each of the one or more user assertion dependencies identified from traversing each path of the connected graph by executing each of the one or more user assertion dependencies.

In some embodiments, the agent may identify a specification for the plurality of test cases having one or more test parameters and establishing the connected graph using the one or more test parameters defined by the specification for each of the plurality of test cases of the test suite. In some embodiments, the agent may concurrently traverse each path of the connected graph to identify the one or more test case dependencies and the one or more API assertion dependencies.

In some embodiments, the agent may traverse each path of the connected graph to identify the one or more test case dependencies. Each of the test case dependencies may indicate that execution of a first test case of the plurality of test cases relies on a resultant of a second test case of the plurality of test cases in a corresponding path of the connected graph. In some embodiments, resolving each test case dependency may include recursively executing the first test case and the second test case in each test case dependency.

In some embodiments, the agent may traverse each path of the connected graph to identify the one or more API assertion dependencies. Each of the API assertion dependencies may indicate that an invocation of a first API assertion relies on a response of a second API assertion in a corresponding path of the connected graph. In some embodiments, resolving each API assertion dependency further comprises recursively executing the first API assertion and the second API assertion in each API assertion. In some embodiments, resolving each API assertion dependency may include using a query parameter to invoke each API assertion of each of the one or more API dependencies to identify a response responsive to invoking each API assertion.

In some embodiments, the agent may identify a response from an API assertion invoked in each of the one or more API dependencies, the response including at least one of a status, content, or a length. In some embodiments, the agent may verify the API assertion based on at least one of the status, the content, or the length of the response. In some embodiments, the agent may perform, subsequent to executing each of the test cases, a cleanup operation to release resources of the device consumed in execution of each of the test cases of the plurality of tests cases of the test suite.

Another aspect of this disclosure is directed to a system for resolving test case dependencies to execute test suites. The system may include a device having one or more processors. The device may establish a connected graph representing a test suite having a plurality of test cases to test an application providing a plurality of application programming interfaces (APIs). The connected graph may have an ordered connection of nodes via a plurality of paths corresponding to each of the plurality of test cases. The ordered connection of nodes may represent one or more test case dependencies and one or more API assertion dependencies to be resolved. The device may traverse the ordered connection of nodes in each path of the connected graph to identify the one or more test case dependencies and the one or more API assertion dependencies. The device may resolve each of the one or more test case dependencies identified from traversing each path of the connected graph by executing each of the one or more test case dependencies. The device may resolve each of the one or more API assertion dependencies identified from traversing each path of the connected graph by executing each of the one or more API assertion dependencies. The device may concurrently execute, responsive to resolving each of the one or more test case dependencies and each of the one or more API assertion dependencies, each of the test cases of the plurality of test cases of the test suite. The device may determine a result of an execution of a test case of the plurality of test cases of the test suite. The result may indicate one of a success or failure in executing the test case.

In some embodiments, the device may establish the connected graph to have in at least one of the plurality of paths one or more user assertion dependencies to be resolved. Each of the one or more user assertion dependencies may include input data to be asserted responsive to a response from one or more API assertions. In some embodiments, the device may resolve each of the one or more user assertion dependencies identified from traversing each path of the connected graph by executing each of the one or more user assertion dependencies.

In some embodiments, the device may identify a specification for the plurality of test cases having one or more test parameters and establishing the connected graph using the one or more test parameters defined by the specification for each of the plurality of test cases of the test suite. In some embodiments, the device may concurrently traverse each path of the connected graph to identify the one or more test case dependencies and the one or more API assertion dependencies.

In some embodiments, the device may traverse each path of the connected graph to identify the one or more test case dependencies. Each of the test case dependencies may indicate that execution of a first test case of the plurality of test cases relies on a resultant of a second test case of the plurality of test cases in a corresponding path of the connected graph. In some embodiments, the device may recursively execute the first test case and the second test case in each test case dependency.

In some embodiments, the device may traverse each path of the connected graph to identify the one or more API assertion dependencies. Each of the API assertion dependencies may indicate that an invocation of a first API assertion relies on a response of a second API assertion in a corresponding path of the connected graph. In some embodiments, resolving each API assertion dependency further comprises recursively executing the first API assertion and the second API assertion in each API assertion. In some embodiments, the device may use a query parameter to invoke each API assertion of each of the one or more API dependencies to identify a response responsive to invoking each API assertion.

In some embodiments, the device may identify a response from an API assertion invoked in each of the one or more API dependencies, the response including at least one of a status, content, or a length. In some embodiments, the device may verify the API assertion based on at least one of the status, the content, or the length of the response. In some embodiments, the device may perform, subsequent to executing each of the test cases, a cleanup operation to release resources of the device consumed in execution of each of the test cases of the plurality of tests cases of the test suite.

BRIEF DESCRIPTION OF THE FIGURES

The foregoing and other objects, aspects, features, and advantages of the present solution will become more apparent and better understood by referring to the following description taken in conjunction with the accompanying drawings, in which.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for resolving test case dependencies to execute test suites.

The integration testing of individual modules of an application may be performed in accordance with a set of test cases specified by a test suite. Composing and running the integration testing using the individual test cases for the test suite may consume a substantial amount time and effort. By automatically resolving test case dependencies among the test cases, the time spent in composing and running the individual test cases may be significantly reduced.

A. Computing Environment

Prior to discussing the specifics of embodiments of the systems and methods of an appliance and/or client, it may be helpful to discuss the computing environments in which such embodiments may be deployed.

Figure 1A:
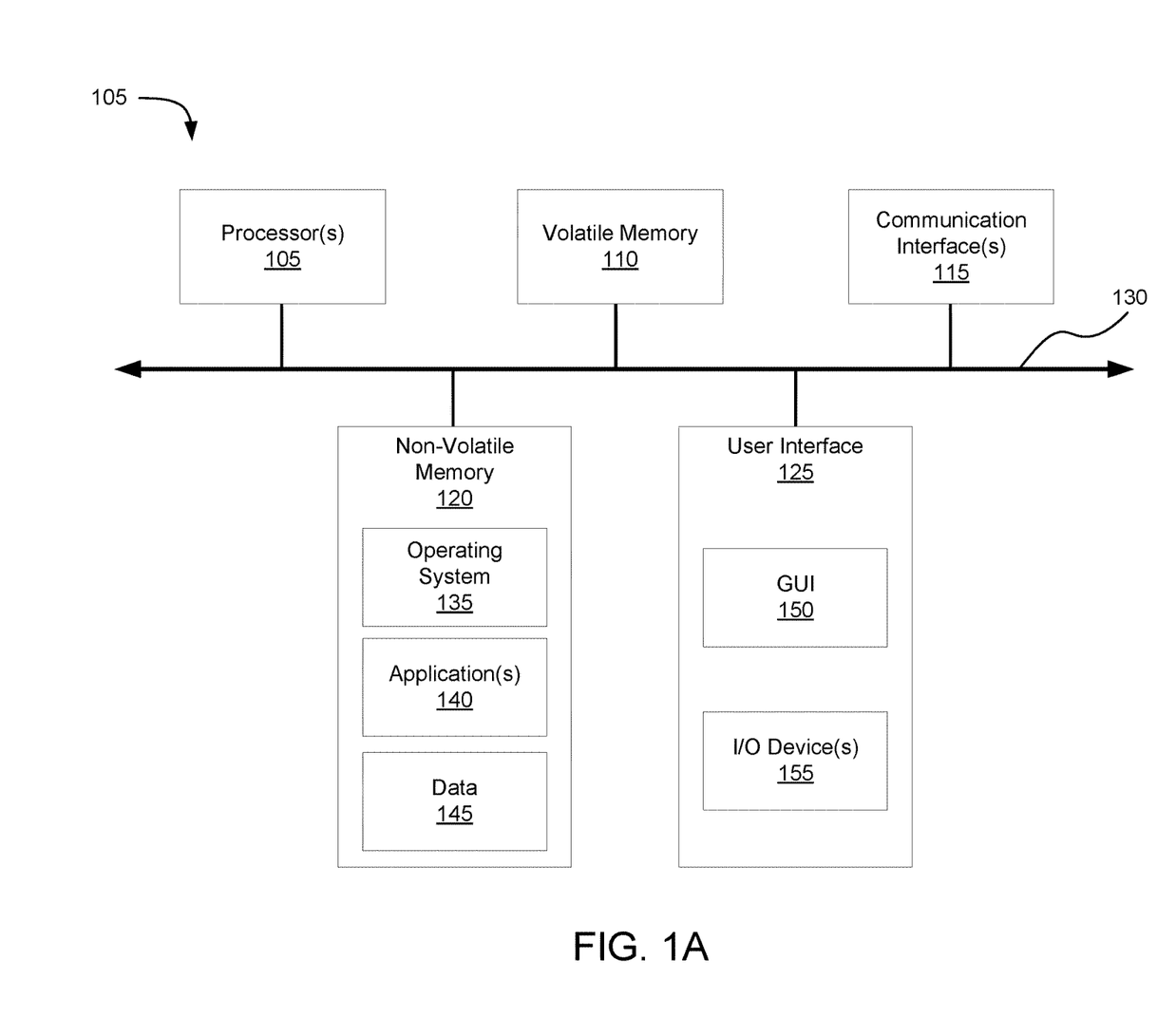
FIG. 1A is a block diagram of embodiments of a computing device.

As shown in FIG. 1A, computer 100 may include one or more processors 105, volatile memory 110 (e.g., random access memory (RAM)), non-volatile memory 130 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 135, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 130 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 135 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
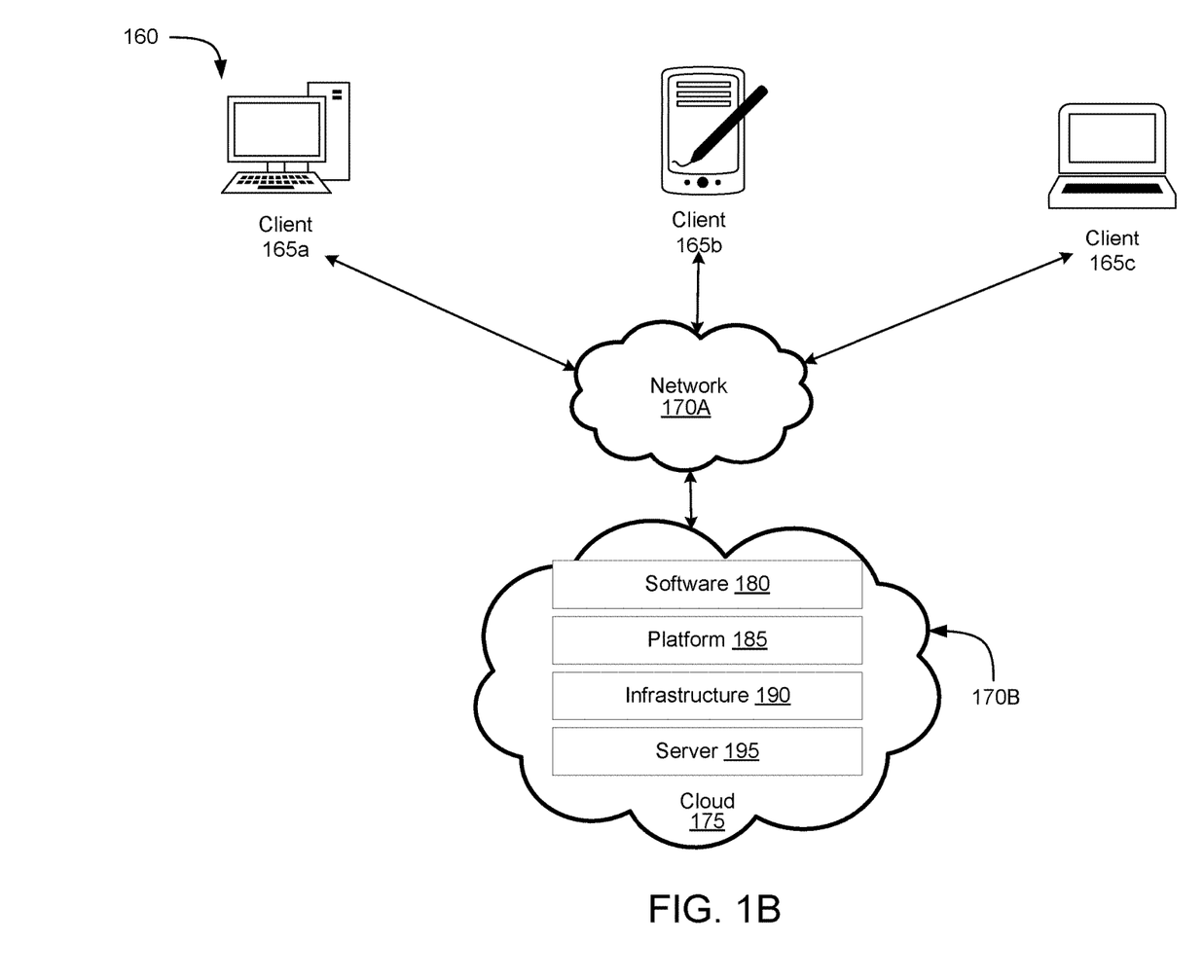
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. For example, computing environment 160 can include a network environment with the one or more clients 165a-165n in communication with one or more servers 195 (also generally referred to as remote machine(s) 190 or server(s) 190) via one or more networks 170 (generally referred to as network(s) 170). Although the embodiment shown in FIG. 1B shows one or more networks 170A, 170B between clients 165 and servers 195, in other embodiments, clients 165 and servers 195 may be on same network 170. The various networks 170 may be the same type of network or different types of networks. For example, in some embodiments, a first network 170A may be a private network such as a local area network (LAN) or a company Intranet, while a second network 170B and/or network may be a public network, such as a wide area network (WAN) or the Internet. In other embodiments, both network 170A and network 170B may be private networks. Networks 170 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

Server 195 can include one or more servers 195 to operate as a server farm. Servers 195 of a server farm may be logically grouped, and may either be geographically co-located (e.g., on premises) or geographically dispersed (e.g., cloud based) from clients 165 and/or other servers 195. In an embodiment, servers 195 of a server farm can execute one or more applications on behalf of one or more of clients 165 (e.g., as an application server), although other uses are possible, such as a file server, gateway server, proxy server, or other similar server uses. Clients 165 may seek access to hosted applications on servers 195. A server 195 may include an application delivery system for delivering a computing environment, application, and/or data files to one or more clients 165. Client 165 may include client agent and computing environment. The computing environment may execute or operate an application (e.g., application 116 of FIG. 1A), that accesses, processes or uses a data file (e.g., data 117 of FIG. 1A). The computing environment, application 116 and/or data file 117 may be delivered by the server 195.

The server 195 may include an application delivery management system to deliver a computing environment to a user (e.g., client 165), remote or otherwise, based on authentication and authorization policies applied by a policy engine of the server 195. A remote user may obtain a computing environment and access to server 195 stored applications 116 and data files 117 from any network-connected device (e.g., client 165). For example, in response to a request, the application delivery system and/or server 195 may deliver the application 116 and data file 117 to client 165, for example via an application stream to operate in a computing environment on client 165, or via a remote-display protocol or otherwise via remote-based or server-based computing. The policy engine may control and manage the access to, and execution and delivery of, applications 116. For example, the policy engine may determine the one or more applications 116 a user or client 165 may access and/or how the application 116 should be delivered to the user or client 165, such as a server-based computing, streaming or delivering the application 116 locally to the client 165 for local execution.

For example, in operation, a client 165 may request execution of an application 116 and the application delivery system of server 195 can determine how to execute application 116, for example based upon credentials received from client 165 and a user policy applied by the policy engine associated with the credentials. For example, the application delivery system may enable client 165 to receive application-output data generated by execution of the application on a server 195, may enable client 165 to execute the application 116 locally after receiving the application 116 from server 195, or may stream the application 116 via network 170 to client 165. For example, in some embodiments, the application 116 may be a server-based or a remote-based application 116 executed on server 195 on behalf of client 165. Server 195 may display output to client 165 using a thin-client or remote-display protocol. The application 116 may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 195 may include a performance monitoring service or an agent. In some embodiments, a dedicated one or more servers 195 may be employed to perform performance monitoring. The performance monitoring may be performed using data collection, aggregation, analysis, management and reporting, for example by software, hardware or a combination thereof. The performance monitoring may include one or more agents for performing monitoring, measurement and data collection activities on clients 165 (e.g., client agent) and/or servers 195 (e.g., agent). In general, the monitoring agents can execute transparently (e.g., in the background) to any application 116 and/or user of the device. The monitoring agents can monitor, measure, collect, and/or analyze data on a predetermined frequency, based upon an occurrence of given event(s), or in real time during operation of computing environment 160. The monitoring agents may monitor resource consumption and/or performance of hardware, software, and/or communications resources of clients 165, networks 170, and/or servers 195. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents can provide application performance management for the application delivery system of the server 195. For example, based upon one or more monitored performance conditions or metrics, the application delivery system may be dynamically adjusted, for example periodically or in real-time, to optimize application delivery by servers 195 to clients 165 based upon network environment performance and conditions. In described embodiments, clients 165 and/or servers 195 can be deployed as and/or executed on any type and form of computing device, such as any desktop computer, laptop computer, or mobile device capable of communication over at least one network and performing the operations described herein. For example, clients 165 and/or servers 195 may each correspond to one computer, a plurality of computers, or a network of distributed computers such as computer 101 shown in FIG. 1A.

The computing environment 165 may include one or more clients 165a-165n, in communication with a cloud 175 over the one or more networks 170. Clients 165 may include, e.g., thick clients, thin clients, and zero clients. The cloud 108 may include back end platforms, e.g., servers 195, storage, server farms or data centers. The clients 165 can be the same as or substantially similar to computer 101 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170 and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include serverless computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., Google Compute Engine provided by Google Inc. of Mountain View, Calif., or others. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and others. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods of Resolving Test Case Dependencies to Execute Test Suites An application may be tested using various approaches to ensure that the application satisfies performance constraints and functions properly with the application providing the expected output in response to predefined inputs within the desired time limit. The approaches to test and evaluate the performance and functioning of the application may include unit testing, integration test, system testing, and acceptance testing. Unit testing may include evaluating specific functions and classes used in the application. Integration testing may entail assessing the interfacing among various modules and components of the application. System testing may encompass analyzing the entire application as a whole to determine whether the application meets system specifications. Acceptance testing may involve examining whether the application satisfies a certain level of quality and is ready for roll out. Each type of testing may entail varying amount of manual evaluation by application developers in evaluating the application.

To facilitate integration testing of the application, a test suite containing a multitude of test cases may be used. The test suite (sometimes referred herein as validation suite) itself may include instructions (e.g., scripts) that define each of the test cases. Each test case may represent a scenario in which one or more of the components of the application may be subject to. The test case specify a set of procedures and inputs to apply to one or more components of the application, and may define an expected output to the inputs applied in accordance with the procedure. The instructions for the test cases of the test suite may be manually composed by the application developer for the application or test. By running the test cases of the test suite for the integration testing, multiple modules and components of the application may be evaluated in accordance with the specifications of each test case. Based on the results of the integration testing, the application developer or test may make changes and adjustments to the application.

One challenge with integration testing (and software testing overall) may be that setting up the tests cases for the test suite may consume a significant amount of time and effort on the part of the application developer (or the application tester). The individual composition of each test case may be especially problematic when the application involves hundreds or thousands of different components interfacing with one another. For example, an application may rely on as much as hundreds of representational state transfer (REST) application programming interfaces (APIs), with several request parameters for each API. Attempting to write integration tests for each REST API with all scenarios covered may be a gargantuan task, leading to strenuous amount of work to compose each individual test case. Even when some amount of automation is incorporated to the setting up of test cases, another challenge may be test case dependencies, with certain test cases depending on the results of other test cases. For example, the test case for testing database availability may rely on executing on a test case on authenticating a test user before fetching user details to access the database.

To address the challenges arising from using test suites in integration testing, an agent running on a device may resolve test case dependencies in the test suite in a non-linear manner, by using a connected graph to represent the multitude of test cases in the test suite. To that end, the agent may automate generation of individual test cases for the test suite. In testing APIs, the test case may entail invocation of an API and assertion of the response from the invocation. The agent may consume the API specifications associated with the application, and may generate a set of test cases with different parameters (e.g., query parameters) and assertions of responses. The agent may also run individual test cases to verify the API, by invoking the API and receiving a response in response to the invocation. The response may contain a status, length, and other content. Based on the contents of the response, the agent may validate the API, and may assign the result of the test case as a success or a failure as a result of the assertion.

Using the test cases of the test suite, the agent may handle the dependencies among the tests cases. In handling the dependencies, the agent may construct a connected graph from the parameters of each test cases of the test suite. The construction of the connected graph may be done in conjunction with the generation of the test cases for the test suite. The connected graph may capture all the relationships related to the dependencies among the test cases. The nodes of the graph may represent an individual test case, and connections between the nodes may correspond to dependencies and other relationships among the test cases. The agent may execute the test cases by traveling through the paths of the connected graph starting from the node for the initial test case to the node for the execution followed by the node for the assertions. In addition, the agent may process execution of the individual test cases of the test suite by traversing each path of the connected graph and executing the test cases in parallel.

By generating the test case in this manner, the running of the integration testing may be further automated, thereby reducing the amount of work on the part of the application developer in setting up the test cases for the test suite. Furthermore, by resolving test case dependencies thus eliminating reliance of one test case upon the result of another test case, each individual test case may be run individually and in any sequence. In this manner, the usefulness of integration testing and software testing overall may increase in rooting out issues with interfacing among the components of the application.

Figure 2:
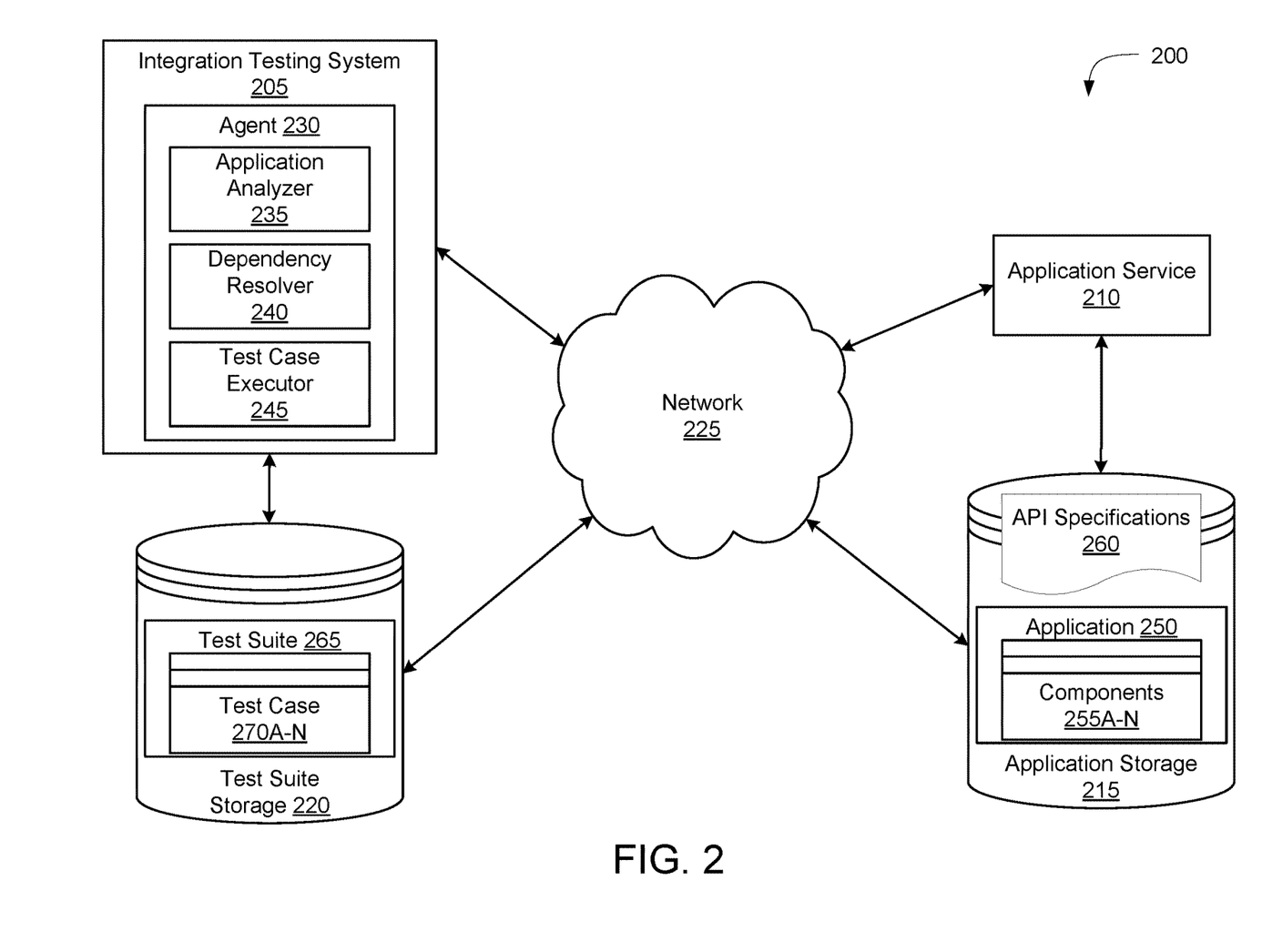
FIG. 2 is a block diagram of an embodiment of an example system for resolving test case dependencies to execute test suites.

Referring now to FIG. 2, depicted is a block diagram of an embodiment of a system 200 for resolving test case dependencies to execute test suites. In overview, the system 200 may include at least one integration testing system 205, at least one application service 210, at least one application storage 215, at least one test suite storage 220, and at least one network 225. The integration testing system 205 may include at least one agent 230 (sometimes referred herein as a test tool). The agent 230 may have at least one application analyzer 235, at least one dependency resolver 240, and at least one test case executor 245. In some embodiments, the integration testing system 205 may include the test suite storage 220. In some embodiments, the application service 210 may include the application storage 215. The network 225 may communicatively couple the integration testing system 205, the application service 210, the application storage 215, and the test suite storage 220, to one another.

Each of the above-mentioned elements or entities is implemented in hardware, or a combination of hardware and software, in one or more embodiments. Each component of the system 200 may be implemented using hardware or a combination of hardware or software detailed above in connection with FIGS. 1A and 1B. For instance, each of these elements or entities can include any application, program, library, script, task, service, process or any type and form of executable instructions executing on hardware of the integration testing system 205, the application service 210, the application storage 215, the test suite storage 220, and the network 225, among others, of the system 200. The hardware includes circuitry such as one or more processors in one or more embodiments.

In further detail, the application service 210 may maintain at least one application 250 on the application storage 215. The application 250 may have been created, developed, or otherwise configured by an entity (e.g., application developer, test, or distributor for the application 250) associated with the application service 210. The application 250 may be configured or constructed in accordance with modular programming, and may include one or more components 255A-N (hereinafter generally referred to as components 255). Each component 255 (sometimes herein referred to as a module) may correspond to a portion of the functionalities of the application 250. In some embodiments, each component 255 may include or correspond to as a set of routines for running the application 250. Each component 255 may have a set of inputs for regulating the corresponding portion of the application 250. In addition, each component 255 may include a set of outputs from the execution of the corresponding portion of the application 250 in accordance with the inputs used.

Additionally, the application service 210 may maintain a set of application programming interface (API) specifications 260 for the application 250 on the application storage 215. The application 250 may rely upon a subset of methods or operations defined by an API (e.g., Representational State Transfer (REST) or Simple Object Access Protocol (SOAP)). The API specifications 260 in turn may specify which operations defined by the API are relied upon by the application 250. In some embodiments, the API specification 260 may include the routines, such as requests, functions, methods, or operations used in the carrying out the functionalities of the application 250. The API specification 260 may list or specify the set of inputs for the routines. The set of inputs may include one or more query parameters and a variable type for each query parameter, among others. The API specification 260 may specify a set of expected outputs or responses from invoking the routines of the application 250 in accordance with the API. Execution of at least one of the specifications in the API specification 260 may depend on the outcome of another specification in the API specification 260.

With modular programming, individual components 255 of the application 250 may be added, updated, replaced, or otherwise modified, independent of the other components 255. Furthermore, the API specifications 260 for the application 250 may be also updated, replaced, added to, or otherwise changed, independent of one another. The modifications to the components 255 or the API specifications 260 may result in exhibition of undesirable behavior or errors, as well as degradations in performance, from running the application 250.

To evaluate and test the application 250, the application service 210 may provide at least one test suite 265 (or specifications for the test suite 265). The test suite 265 may be defined or configured at least in part by a user or an entity associated with the application service 210, and may be used to test the individual components 255 of the application 250. The test suite 265 may define, list, or otherwise include a set of test cases 270A-N (hereinafter generally referred to as test case 270). Each test case 270 may denote a scenario or a set of conditions under which to evaluate the performance of one or more of the components 255 of the application 250. Each test case 270 may include a set of test parameters specified for evaluating the one or more components 255. The test parameter for the test case 270 may include testing procedure indicating which sequence of the functionalities are to be tested. The test parameter for the test case 270 may include test input data (e.g., query parameters and variable type) to be applied. In some embodiments, the input data and testing procedure may be defined in accordance with the API specifications 260 for the application 250. The test parameter for the test case 270 may include expected output or results from applying the input data. The test parameter for the test case 270 may also include a prerequisite or precondition to be fulfilled prior to execution of the test case 270. The execution of at least one test cases 270 in the test suite 265 may rely on the output from another test case 270 as indicated in the prerequisite. The test cases 270 may have other data, such as an identifier, a descriptor, an author, and a category, among others.

Upon configuration, the application service 210 may transmit the test suite 265 over the network 225 to the integration testing system 205. In some embodiments, the application service 210 may provide the API specifications 260 to the integration testing system 205 via the network 225. In some embodiments, the application service 210 may provide at least one user assertion for at least one of the API specifications 260. The user assertion may be specified by the entity associated with the application service 210. Each user assertion may specify input data (e.g., query parameters) to be asserted to one API assertion in response to a response to an API assertion as defined in the API specifications 260. The user assertion may specify the expected response to the input data. In some embodiments, the user assertion may be defined for a specified routine to be invoked in carrying out the functionalities of the application 250. The user assertions may be provided by the application service 210 in conjunction with the API specifications 260.

The application analyzer 235 of the agent 230 executing on the integration testing system 205 may identify the application 250 to be tested. The application analyzer 235 may also receive or identify the test suite 265 provided by the application service 210. The application analyzer 235 may store and maintain the test suite 265 including the test cases 270 on the test suite storage 220. In some embodiments, the application analyzer 235 may construct or generate the test cases 270 to include into the test suite 265 using the specifications provided by the application service 210. The specification for the test suite 265 may include one or more scripts. The application analyzer 235 may identify different portions (e.g., different functions or separate scripts) as individual test cases 270 to include into the test suite 265. Upon generation, the application analyzer 235 may store the test suite 265 onto the test suite storage 220.

In some embodiments, the application analyzer 235 may receive or identify the API specifications 260 for the application 250 provided by the application service 210. In some embodiments, the application analyzer 235 may receive and identify the user assertions for at least one of the API specifications 260. The user assertions may be received in conjunction with the API specifications 260. In some embodiments, using the API specifications 260 provided by the application developer service 210, the application analyzer 235 may generate additional test cases 270 to include in the test suite 275. In some embodiments, the application analyzer 235 may parse the API specification 260 to identify one or more operations defined by the API are relied upon by the application 250. With the identification of each operation, the application analyzer 235 may identify each routine in carrying out the functionalities of the application 250. The application analyzer 235 may also identify the set of inputs for each identified routine. In some embodiments, the application analyzer 235 may identify the user assertion to be applied to the identified routine as defined in the API specification 260. In some embodiments, the application analyzer 235 may identify the set of outputs for each identified routine.

Based on the identified routine and the inputs for the routine, the application analyzer 235 may generate an additional test case 270. The generation of the test case 270 may be in accordance with a template for the API specification 260. For example, the template used to generate the test case 270 may be for operations as defined by the REST API or the SOAP API. The template may specify the testing procedure for the operation corresponding to the identified routine to include in the test case 270. The template may specify the test input data for the test case 270 for the operation. In some embodiments, the template may indicate that the user assertion provided by the application service 210 for the matching routine is to be included in the test case 270. The template may specify the prerequisite (e.g., an outcome of another operation defined by the API listed in the API specifications 260) to be satisfied prior to invocation of the test case 270. In some embodiments, the template may specify inclusion of other data into the test case 270, such as the identified, descriptor, and category, among others. Upon generation, the application analyzer 235 may include the test case 270 into the test suite 265 for testing the application 250. In some embodiments, the application analyzer 235 may add the test case 270 onto the test suite 265 maintained on the test suite storage 220.

Figure 3:
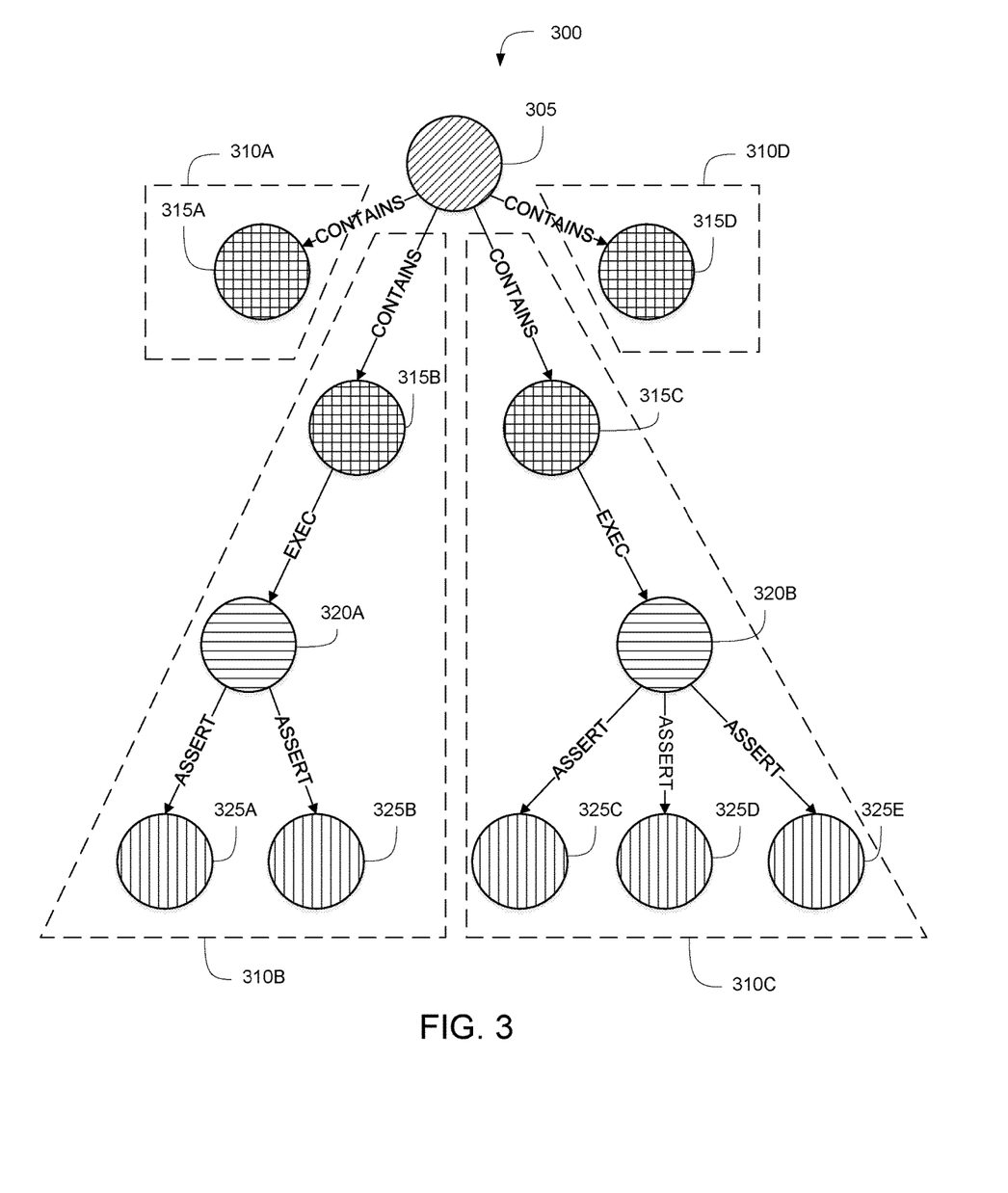
FIG. 3 is a block diagram of an example connected graph used in the system for resolving test case dependencies to execute test suites.

Referring now to FIG. 3, depicted is a block diagram of a connected graph 300 used in the system 200 for resolving test case dependencies to execute test suites. In the context of FIG. 2, the dependency resolver 240 of the agent 230 executing on the integration testing system 205 may generate, construct, or otherwise establish at least one connected graph 300 using the set of test cases 270 of the test suite 260. In some embodiments, the agent 230 may traverse through the set of test cases 270 in constructing the connected graph 300. The connected graph 300 may be maintained as any data structure, such as a tree (e.g., as depicted), a heap, a linked list, an array, a queue, a stack, or a hash-based structure, among others. The connected graph 300 may represent the test suite 265. In particular, the connected graph 300 may represent the relationships among the test cases 270 of the test suite 265.

The connected graph 300 may include a set of paths 310A-N (hereinafter generally referred to as path 310). Each path 310 (sometimes referred to as a branch) may include an ordered connection of nodes. At the start of each path 310, the connected graph 300 may include a head node 305 corresponding to the test suite 270. Each subsequent node in the paths 310 may represent or correspond to one of the test cases 270 of the test suite 265, an execution specified by a prerequisite of the test case 270, an API assertion, or a user assertion to be invoked. For example, as depicted, in the connected graph 300, each of the nodes 315A-D may represent a corresponding test case 270A-D. Each of the nodes 320A and 320B may represent an operation to be executed as a prerequisite for the test cases 270B and 270C respectively.

The dependency of the test case 270B and 270C on the respective requisites may be represented by the connections between the nodes 315B and 320A and 315C and 320B respectively. Furthermore, the nodes 325A-E may represent assertions, such as API assertions or user assertions defined by the application service 210. The dependency of the requisites for the test cases 270B with the assertions may be represented by the connections between nodes 320A with nodes 325A and 325B. Likewise, the dependency of the requisites for the test cases 270C with the assertions may be represented by the connections between nodes 320B with nodes 325C-E.

The presence of an ordered connection of nodes along a path 310 in the connected graph 300 may represent a dependency. Furthermore, within such a path 310, a node closer to the head node 305 representing the test suite 270 may be dependent on the nodes farther away from the starting node 305. For example, as depicted, the ordered connection of nodes 315B, 320A, and 325A along the path 310B may represent a dependency, with node 320A dependent on the node 325A and node 315B dependent on the node 320A. The dependency may be of one of multiple types of dependencies, such as a test case dependency, an API assertion dependency, or a user assertion dependency, among others. For example, the execution of a first test case 270A representing data retrieval relying upon an output of a second test case 270B representing user login may be a test case dependency.

To identify the dependencies, the dependency resolver 240 may traverse the ordered connection of nodes in each path 310 of the connected graph 300. In some embodiments, the dependency resolver 240 may traverse each path 310 of the connected graph 300 concurrently or in parallel. For traversing each path 310, the dependency resolver 240 may use an index (e.g., a pointer, a counter value, or a reference) to identify or track the individual node of the connected graph 300 visited and parsed. At each node, the dependency resolver 240 may identify another node connected to the node in the connected graph 300. For example, the dependency resolver 240 may identify the node 320B from the node 315C while traversing the path 310C. The identification of the pair of connected nodes may represent a dependency. From traversing the nodes in each path 310, the dependency resolver 240 may identify the pair of connected nodes as a dependency. Upon identification of each dependency, the dependency resolver 240 may identify or determine the type of dependency for the dependency from the ordered connection of nodes in the path 310 of the connected graph 300. To determine the type of dependency, the dependency resolver 240 may identify the node in the pair (or the ordered connection) farther along the path 310 from the head node 305.

Based on the identified node, the dependency resolver 240 may determine the type of dependency. When the node farther along the path 310 is identified as representing a test case 270 or is an execution node, the dependency resolver 240 may determine the type of dependency as a test case dependency. For example, the connection between nodes 315B and 320A may be identified as a test case dependency. When the node farther along the path 310 is identified as representing an API assertion, the dependency resolver 240 may determine the type of dependency as an API assertion dependency. For example, the node 325A may represent an API assertion, and the connection between nodes 320A and 325A may be identified as an API assertion dependency. When the node farther along the path 310 is identified as representing a user assertion, the dependency resolver 240 may determine the type of dependency as a user assertion dependency. For example, the node 325C may represent a user assertion, and the connection between nodes 320B and 325C may be identified as a user assertion dependency.

While traversing each path 310 in the connected graph 300, the dependency resolver 240 may resolve the dependency by executing each of the identified dependencies. As the resolution is performed while traversing each path 310, the dependency resolver 240 may execute in accordance with the order of the connected nodes in the path 310. For example, in the path 310C as depicted, the dependency resolver 240 may first execute the test case 270C represented by the node 315C, then execute the operations represented by the node 320B, and then perform the API assertion represented by the node 325D. Additionally, since each path 310 of the connected graph 300 is traversed in parallel, the dependency resolver 240 may resolve the ordered connection of nodes in one path 310 independently of the nodes in another path 310.

When the dependency is identified as a test case dependency, the dependency resolver 240 may resolve the test case dependency by executing each test case 270 in the test case dependency. The test case dependency may indicate that execution of a first test case 270A in the test suite 270 may rely on an outcome of the execution of a second test case 270B. The nodes corresponding to the first test case 270A and the second test case 270B may be in the same connected order of nodes in the same path 310 of the connected graph 300. To resolve the test case dependency, the dependency resolver 240 may execute each test case 270 involved (e.g., the first test case 270A and the second test case 270B). In some embodiments, the dependency resolver 240 may execute each test case 270 involved recursively. The dependency resolver 240 may execute each test case 270 in accordance with the test parameters specified by the test case 270. In executing, the dependency resolver 240 may invoke the sequence of functions to be invoked with the test input data as specified. In some embodiments, when the outcome from the relied on test case 270 becomes available, the dependency resolver 240 may feed the outcome to as input to the other test case 270.

When the dependency is identified as an API assertion dependency, the dependency resolver 240 may resolve the API assertion dependency by executing each test case 270 in the API assertion dependency. The API assertion dependency may indicate that invocation of a test case 270, a user assertion, or another API assertion may rely on an outcome (e.g., a response) of the invocation of an API assertion. The node corresponding to the at least one of API assertions in the API assertion dependency may be in the same connected order of nodes in the same path 310 of the connected graph 300. To resolve the API assertion dependency, the dependency resolver 240 may execute API assertion. In some embodiments, the dependency resolver 240 may execute each API assertion involved recursively. The dependency resolver 240 may execute each test case 270 in accordance with the specifications of the API specifications 260 for the API assertion.

In executing the API assertions, the dependency resolver 240 may invoke the sequence of routines to be invoked with the test input data as specified. In some embodiments, the dependency resolver 240 may use a query parameter (e.g., as defined for the REST API) to invoke each API assertion involved in the API assertion dependency. The invocation of the API assertion in accordance with the input data (e.g., query parameter) may cause the API assertion to output a response. Upon identification of a response from one of the API assertion, the dependency resolver 240 may feed the response to another API assertion, a test case 270, or a user assertion as input.

When the dependency is identified as a user assertion dependency, the dependency resolver 240 may resolve the user assertion dependency by executing each test case 270 in the user assertion dependency. The user assertion dependency may indicate that invocation of a test case 270, an API assertion, or another user assertion may rely on an outcome (e.g., a response) of the invocation of a routine specified by a user assertion. The node corresponding to the at least one of user assertions in the user assertion dependency may be in the same connected order of nodes in the same path 310 of the connected graph 300. To resolve the user assertion dependency, the dependency resolver 240 may execute user assertion. In some embodiments, the dependency resolver 240 may execute each user assertion involved recursively. The dependency resolver 240 may execute each test case 270 in accordance with the specifications for the user assertion provided by the application service 210.

In executing each user assertion, the dependency resolver 240 may invoke the sequence of routines with the test input data as specified by the user assertion. In some embodiments, the dependency resolver 240 may use a query parameter to invoke each user assertion involved in the dependency. The invocation of the user assertion in accordance with the input data (e.g., query parameter) may cause the user assertion to output a response. Upon identification of a response from one of the user assertion, the dependency resolver 240 may feed the response to another user assertion, a test case 270, or an API assertion as input.

The test case executor 245 of the agent 230 executing on the integration testing system 205 may concurrently execute each of the test cases 270 of the test suite 270 with the resolution of all the dependencies using the connected graph 300. The execution of the test cases 270 may be performed in parallel. To execute, the test case executor 245 may perform each test case 270 in accordance with the testing parameters. In some embodiments, the test case executor 245 may invoke the sequence of functions specified by the test case 270 with the test input data as specified. The sequence of functions may correspond to one or more of the components 255 of the application 250 subject to evaluation in the test case 270. With the running on each test case 270, the test case executor 245 may identify at least one output from the invocation of the functions as specified by the test case 270.

Based on the output of each test case 270, the test case executor 245 may determine whether an evaluation result of the test case 270 as success or failure in executing the test case 270. To determine, the test case executor 245 may compare the output to the expected outputs specified by the corresponding test case 270. When the output from execution differs from the expected output, the test case executor 245 may determine the result of the execution of the test case 270 as failure. Conversely, when the output from the execution matches the expected output, the test case executor 245 may determine the result of the execution of the test case 270 as successful. Since the dependencies have been resolved, the test case executor 245 may run the integration testing for the application 250 and evaluate using the test cases 270 of the test suite 265 at a much quicker rate with minimal interruptions.

In some embodiments, the test case executor 245 may validate the API specification 260 for the application 250. To validate, the test case executor 245 may identify the response from invocation of each API assertion. The identification of the response may be concurrent to the execution of the API assertions in the resolution of API assertion dependencies. The response may indicate or include a status, content, and a length, and may be generated in accordance with the API used in the API specification 260. The status may be a code (e.g., a HTTP status code) to indicate a state of the processing and invocation of the API assertion. The content may include a resultant outcome from the inputs used to invoke the API assertion. The length may indicate a length of the content or the response overall. The test case executor 245 may compare the response from the API assertion with the expected results from application of the input data specified by the API specifications 260. When the response deviate from the expected result, the test case executor 245 may determine the API assertion as not verified. On the other hand, when the response matches the expected result, the test case executor 245 may determine the API assertion as verified. By repeating this process over all the API assertions, the test case executor 245 may validate the entire API specifications 260.

In some embodiments, the test case executor 245 may perform a cleanup operation, subsequent to the execution of each test case 270 of the test suite 265. To perform the cleanup operation, the test case executor 245 may identify computing resources allocated to or consumed in executing the test cases 270 of the test suite 265. The computing resources may include memory, data storage, a processing capacity, network bandwidth, among others. With the identification, the test case executor 245 may release each of the computing resources from allocation for the running of the test cases 270 of the test suite 265.

Figure 4:
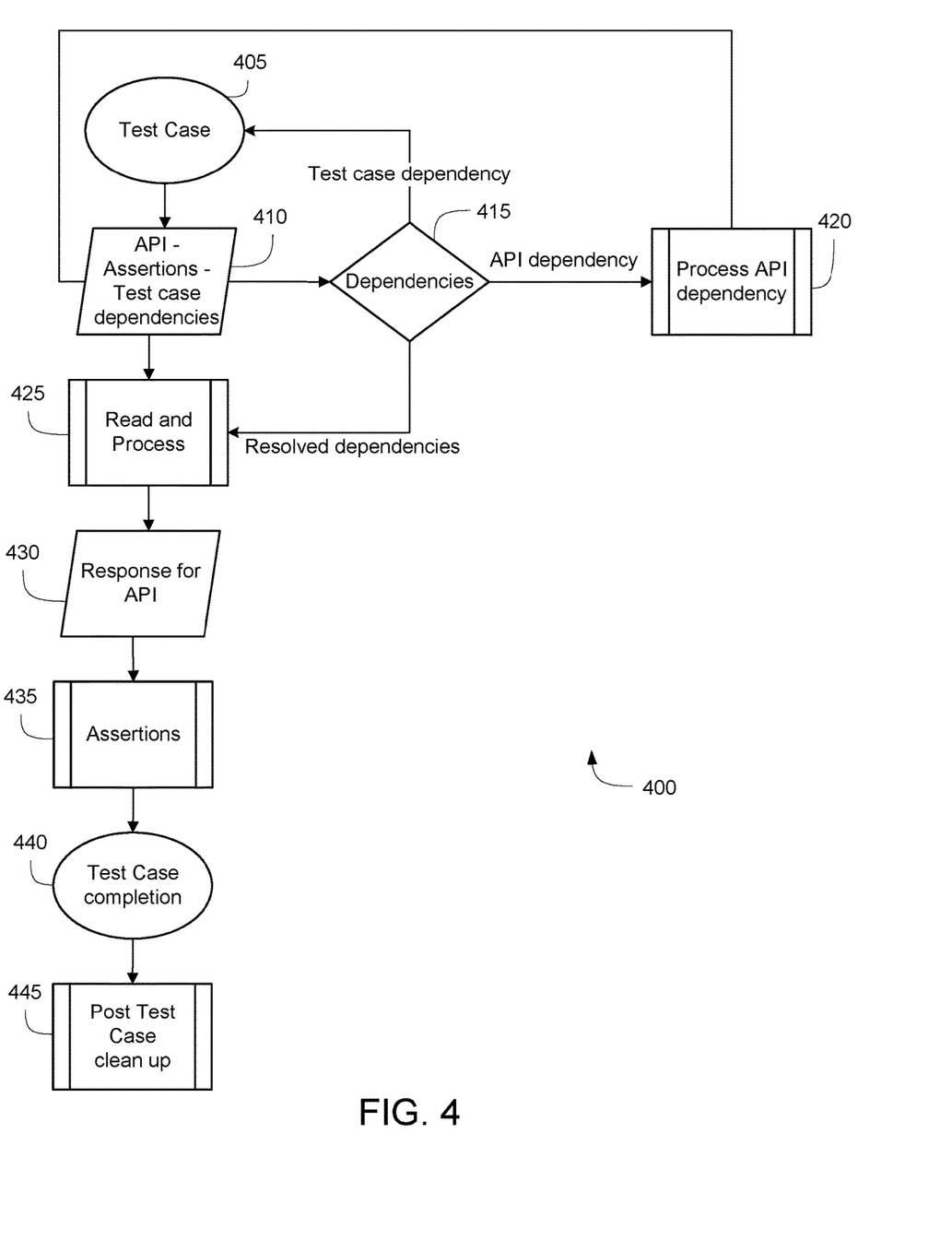
FIG. 4 is a process diagram of an embodiment of an example method for resolving test case dependencies to execute test suites.

Referring now to FIG. 4, depicted is a process diagram of a method 400 for resolving test case dependencies to execute test suites. The operations and functionalities of the method 400 may be performed by the components described in FIGS. 1A, 1B, 2, and 3, such as the integration testing system 205. As depicted, a computing device (e.g., the integration testing system 205) may create and run a test case in a test suite (405). The computing device may identify input data, such as API assertions and test case dependencies (410). The input data may include assertion conditions that are to be applied on a response. The input data may include the test case dependencies defining the order in which the test cases are to be applied. The computing device may determine whether there is a test case dependency, an API dependency, or a resolved dependency (415). When it is a test case dependency, the computing device may repeat the functionality of (400), and execute the test cases to resolve the dependencies. When it is an API dependency, the computing device may process the API dependency to resolve (420). Otherwise, upon resolution of the dependencies, the computing device may read and process all the test cases of the test suite in parallel (425). In processing, the computing device may apply user input assertions on the response (435), and may determine whether the execution of the test case is a success or a failure based on a result of the assertions (440). Subsequent to the execution of the test cases, the computing device may perform a cleanup operation (445).

Figure 5:
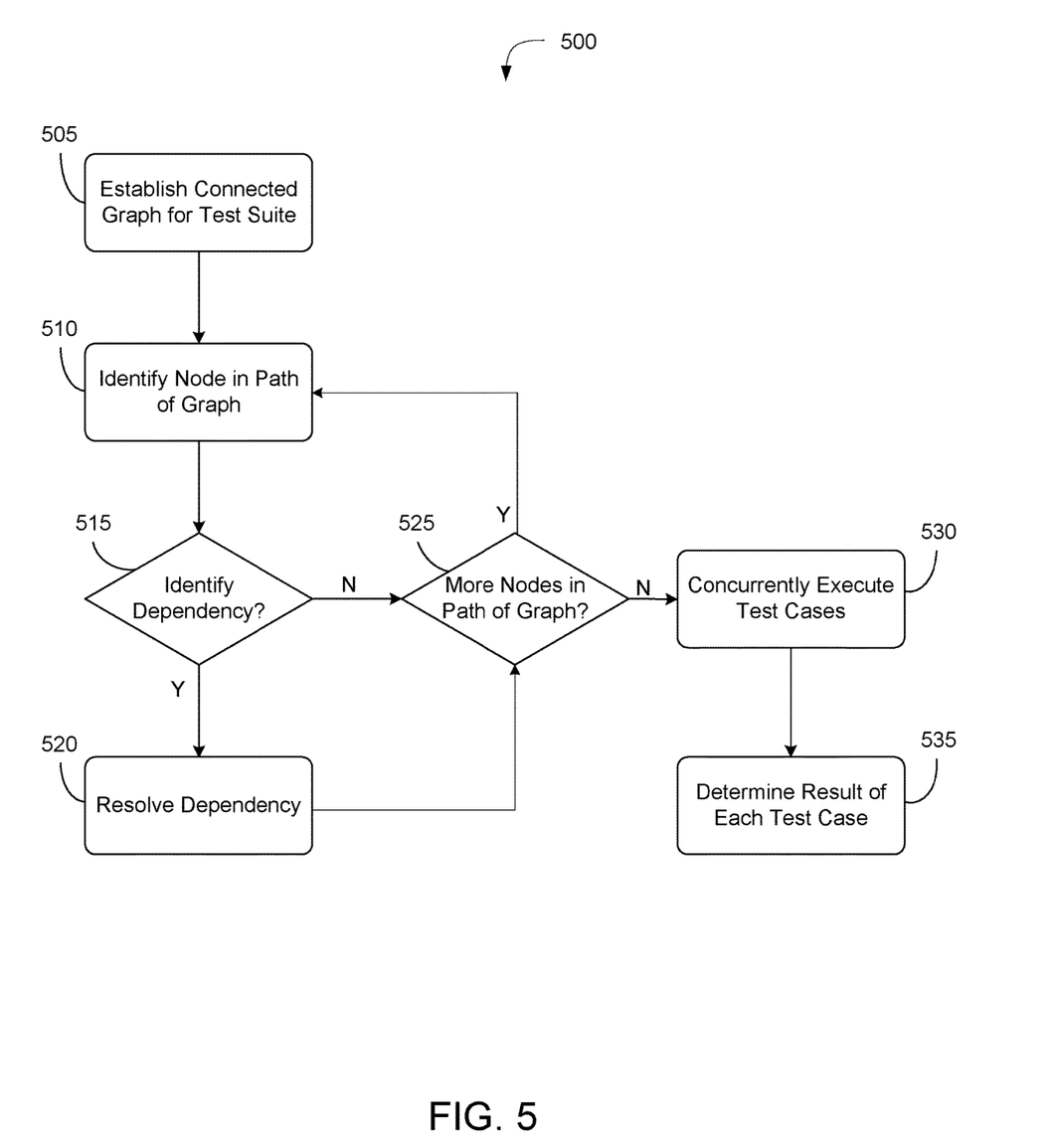
FIG. 5 is a flow diagram of an embodiment of an example method for resolving test case dependencies to execute test suites.

Referring now to FIG. 5, depicted is a flow diagram of a method 500 for resolving test case dependencies to execute test suites. The operations and functionalities of the method 500 may be performed by the components described in FIGS. 1A, 1B, 2, and 3, such as the integration testing system 205. In brief overview, a computing device may establish a connected graph for a test suite (505). The computing device may identify a node in a path of the connected graph (510). The computing device may identify a dependency (515). If a dependency is identified, the computing device may resolve the dependency (520). The computing device may determine whether there are more node sin the path of the graph (525). The computing device may concurrently execute test cases (530). The computing device may determine a result of each test case (535).

In further detail, a computing device (e.g., the integration testing system 205) may establish a connected graph (e.g., the connected graph 300) for a test suite (e.g., the test suite 265) (505). The computing device may use a set of test cases (e.g., test cases 270) of the test suite to construct the connected graph. The connected graph may represent the relationships among the test cases of the test suite. The connected graph may include a set of paths (e.g., the path 310) or branches. At least one of the paths in the connected graph may include an ordered connection of nodes. The ordered connection of nodes may indicate the presence of a dependency.

The computing device may identify a node in the path of the connected graph (510). The computing device may traverse each path of the connected graph in parallel, starting from a head node (e.g., the node 305). The node identified in the path may be a node not yet visited by the computing device during the traversal of the connected graph. The computing device may identify a dependency (515). The computing device may identify a dependency from the ordered connection of nodes (e.g., a pair of nodes in the path). Upon identification of the dependency, the computing device may determine a type of the dependency, such as a test case dependency, an API assertion dependency, or a user assertion dependency.

When a dependency is identified, the computing device may resolve the dependency (520). To resolve, the computing device may execute the dependency. When the dependency is determined to be a test case dependency, the computing device may recursively execute the one or more test cases involved. When the dependency is determined to be an API assertion dependency, the computing device may recursively execute and invoke each API assertion involved in the dependency. When the dependency is determined to be a user assertion dependency, the computing device may recursively execute and invoke each user assertion involved in the dependency. The computing device may determine whether there are more nodes in the path of the graph (525). If there are more, the computing device may repeat the functionality of (510).

If there are no more nodes in the path of the graph, the computing device may concurrently execute test cases (530). With the resolution of the dependencies in each path of the connected graph, the computing device may run each test case of the suite in parallel. In running the test cases, the computing device may invoke the sequence of functions specified by the test case with the test input data as specified. The computing device may determine a result of each test case (535). The computing device may compare an output from execution of the test case with an expected output. When the outputs differ, the computing device may determine the result of the test case as a failure. When the outputs match, the computing device may determine the result of the test case as a success.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof.

In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of resolving test case dependencies to execute test suites, the method comprising:

establishing, by an agent executing on a device having one or more processors, a connected graph representing a test suite having a plurality of test cases to test an application providing a plurality of application programming interfaces (APIs), the connected graph having an ordered connection of nodes via a plurality of paths, each node in the ordered connection of nodes corresponding to at least one of the plurality of test cases, one or more operations to be executed as a prerequisite of at least one of the plurality of test cases, and at least one of the plurality of APIs to be asserted, the ordered connection of nodes representing (i) one or more test case dependencies between at least two of the plurality of test cases and (ii) one or more API assertion dependencies between at least one of the plurality of test cases or at least one of the operations and at least one of the plurality of APIs to be asserted;

traversing, by the agent, the ordered connection of nodes in each path of the connected graph to identify (i) the one or more test case dependencies corresponding to nodes connected to the traversed nodes representing one or more of the plurality of test cases and (ii) the one or more API assertion dependencies corresponding to nodes connected to the traversed nodes are one or more of the plurality of APIs to be asserted;

resolving, by the agent, each of the one or more test case dependencies identified from traversing each path of the connected graph by recursively executing one or more test cases in each of the one or more test case dependencies;

resolving, by the agent, each of the one or more API assertion dependencies identified from traversing each path of the connected graph by recursively executing one or more test cases in each of the one or more API assertion dependencies;

concurrently executing, by the agent, responsive to resolving each of the one or more test case dependencies and each of the one or more API assertion dependencies, each of the test cases of the plurality of test cases of the test suite; and determining, by the agent, a result of an execution of a test case of the plurality of test cases of the test suite, the result indicating one of a success or failure in executing the test case.

2. The method of claim 1, further comprising establishing, by the agent, the connected graph to have, in at least one of the plurality of paths, one or more user assertion dependencies to be resolved, wherein each of the one or more user assertion dependencies includes input data to be asserted responsive to a response from one or more API assertions.

3. The method of claim 2, further comprising resolving, by the agent, each of the one or more user assertion dependencies identified from traversing each path of the connected graph by executing each of the one or more user assertion dependencies.

4. The method of claim 1, further comprising identifying, by the agent, a specification for the plurality of test cases having one or more test parameters and establishing the connected graph using the one or more test parameters defined by the specification for each of the plurality of test cases of the test suite.

5. The method of claim 1, further comprising concurrently traversing, by the agent, each path of the connected graph to identify the one or more test case dependencies and the one or more API assertion dependencies.

6. The method of claim 1, further comprising traversing, by the agent, each path of the connected graph to identify the one or more test case dependencies, each of the test case dependencies indicating that execution of a first test case of the plurality of test cases relies on a resultant of a second test case of the plurality of test cases in a corresponding path of the connected graph; and wherein resolving each test case dependency further comprises recursively executing the first test case and the second test case in each test case dependency.

7. The method of claim 1, further comprising traversing, by the agent, each path of the connected graph to identify the one or more API assertion dependencies, each of the API assertion dependencies indicating that an invocation of a first API assertion relies on a response of a second API assertion in a corresponding path of the connected graph; and wherein resolving each API assertion dependency further comprises recursively executing the first API assertion and the second API assertion in each API assertion.

8. The method of claim 1, wherein resolving each API assertion dependency further comprises using a query parameter to invoke each API assertion of each of the one or more API assertion dependencies to identify a response responsive to invoking each API assertion.

9. The method of claim 1, further comprising:
identifying, by the agent, a response from an API assertion invoked in each of the one or more API assertion dependencies, the response including at least one of a status, content, or a length; and
verifying, by the agent, the API assertion based on at least one of the status, the content, or the length of the response.

10. The method of claim 1, further comprising performing, by the agent, subsequent to executing each of the test cases, a cleanup operation to release resources of the device consumed in execution of each of the test cases of the plurality of test cases of the test suite.

11. A system for resolving test case dependencies to execute test suites, the system comprising:
a device having one or more processors, configured to:
establish a connected graph representing a test suite having a plurality of test cases to test an application providing a plurality of application programming interfaces (APIs), the connected graph having an ordered connection of nodes via a plurality of paths, each node in the ordered connection of nodes corresponding to at least one of the plurality of test cases, one or more operations to be executed as a prerequisite of at least one of the plurality of test cases, and at least one of the plurality of APIs to be asserted, the ordered connection of nodes representing (i) one or more test case dependencies between at least two of the plurality of test cases and (ii) or more API assertion dependencies between at least one of the plurality of test cases or at least one of the operations and at least one of the plurality of APIs to be asserted;
traverse the ordered connection of nodes in each path of the connected graph to identify (i) the one or more test case dependencies corresponding to nodes connected to the traversed nodes representing one or more of the plurality of test cases and (ii) the one or more API assertion dependencies corresponding to nodes connected to the traversed nodes are one or more of the plurality of APIs to be asserted;
resolve each of the one or more test case dependencies identified from traversing each path of the connected graph by recursively executing one or more test cases in each of the one or more test case dependencies;
resolve each of the one or more API assertion dependencies identified from traversing each path of the connected graph by recursively executing one or more test cases in each of the one or more API assertion dependencies;
concurrently execute, responsive to resolving each of the one or more test case dependencies and each of the one or more API assertion dependencies, each of the test cases of the plurality of test cases of the test suite; and
determine a result of an execution of a test case of the plurality of test cases of the test suite, the result indicating one of a success or failure in executing the test case.

12. The system of claim 11, wherein the device is further configured to establish the connected graph to have, in at least one of the plurality of paths, one or more user assertion dependencies to be resolved, wherein each of the one or more user assertion dependencies includes input data to be asserted responsive to a response from one or more API assertions.

13. The system of claim 12, wherein the device is further configured to resolve each of the one or more user assertion dependencies identified from traversing each path of the connected graph by executing each of the one or more user assertion dependencies.

14. The system of claim 11, wherein the device is further configured to identify a specification for the plurality of test cases having one or more test parameters and establish the connected graph using the one or more test parameters defined by the specification for each of the plurality of test cases of the test suite.

15. The system of claim 11, wherein the device is further configured to traverse concurrently each path of the connected graph to identify the one or more test case dependencies and the one or more API assertion dependencies.

16. The system of claim 11, wherein the device is further configured to:
 traverse each path of the connected graph to identify the one or more test case dependencies, each of the test case dependencies indicating that execution of a first test case of the plurality of test cases relies on a resultant of a second test case of the plurality of test cases in a corresponding path of the connected graph; and
 recursively execute the first test case and the second test case in each test case dependency.

17. The system of claim 11, wherein the device is further configured to:
 traverse each path of the connected graph to identify the one or more API assertion dependencies, each of the API assertion dependencies indicating that an invocation of a first API assertion relies on a response of a second API assertion in a corresponding path of the connected graph; and
 recursively execute the first API assertion and the second API assertion in each API assertion.

18. The system of claim 11, wherein the device is further configured to use a query parameter to invoke each API assertion of each of the one or more API assertion dependencies to identify a response responsive to invoking each API assertion.

19. The system of claim 11, wherein the device is further configured to:
 identify a response from an API assertion invoked in each of the one or more API assertion dependencies, the response including at least one of a status, content, or a length; and
 verify the API assertion based on at least one of the status, the content, or the length of the response.

20. The system of claim 11, wherein the device is further configured to perform, subsequent to executing each of the test cases, a cleanup operation to release resources of the device consumed in execution of each of the test cases of the plurality of test cases of the test suite.

* * * * *